(12) United States Patent
Been

(10) Patent No.: US 10,024,450 B2
(45) Date of Patent: Jul. 17, 2018

(54) HIGH SPEED SHUTDOWN DEVICE FOR ELECTRIC ACTUATOR

(71) Applicant: John J. Been, Fort Collins, CO (US)

(72) Inventor: John J. Been, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/332,314

(22) Filed: Oct. 24, 2016

(65) Prior Publication Data

US 2017/0146147 A1    May 25, 2017

Related U.S. Application Data

(60) Provisional application No. 62/260,092, filed on Nov. 25, 2015.

(51) Int. Cl.
*F16K 31/00* (2006.01)
*F16K 31/04* (2006.01)
*F16K 31/56* (2006.01)

(52) U.S. Cl.
CPC ............ *F16K 31/047* (2013.01); *F16K 31/56* (2013.01)

(58) Field of Classification Search
CPC ........ F16K 31/04; F16K 31/047; F16K 31/50; F16K 31/56; F16H 25/20; F16H 25/24
See application file for complete search history.

(56) References Cited

U.S. PATENT DOCUMENTS

| | | | |
|---|---|---|---|
| 6,981,428 B2 | 1/2006 | Donald et al. | |
| 7,059,418 B2 * | 6/2006 | Greeb | E21B 34/02 166/332.1 |
| 2003/0102192 A1 * | 6/2003 | Kapaan | F16D 65/18 188/72.7 |
| 2004/0134665 A1 * | 7/2004 | Greeb | E21B 34/02 166/379 |
| 2004/0135112 A1 * | 7/2004 | Greeb | E21B 34/02 251/214 |
| 2011/0101806 A1 | 5/2011 | Lövgren et al. | |

FOREIGN PATENT DOCUMENTS

| | | |
|---|---|---|
| DE | 29801229 U1 | 5/1998 |
| EP | 0512139 A1 | 11/1992 |
| WO | WO 2001/014775 A1 | 3/2001 |
| WO | WO 2009/045140 A1 | 4/2009 |

* cited by examiner

*Primary Examiner* — Victor L MacArthur
(74) *Attorney, Agent, or Firm* — Reinhart Boerner Van Deuren P.C.

(57) ABSTRACT

A high speed, fail-safe device for an electric actuator that can be independently triggered in the event of an emergency shutdown is provided. An electromagnetic brake is attached to the roller nut of the screw actuator. When actuated, the brake prevents rotation of the roller nut, and therefore enables linear movement of the roller nut upon rotation of the lead screw to linearly move an output shaft to actuate the valve. During actuation a return spring is compressed to enable retraction of the output shaft upon system failure. During such failure, the electric break is de-energized, which allows the roller nut to rotate and linearly move under force of the return spring to retract the output shaft to its fail-safe condition. A soft-stop/over-travel system is provided to limit the impact loads on the lead screw.

19 Claims, 3 Drawing Sheets

HIGH SPEED SHUTDOWN DEVICE FOR ELECTRIC ACTUATOR

CROSS-REFERENCE TO RELATED PATENT APPLICATION

This patent application claims the benefit of U.S. Provisional Patent Application No. 62/260,092, filed Nov. 25, 2015, the entire teachings and disclosure of which are incorporated herein by reference thereto.

FIELD OF THE INVENTION

This invention generally relates to valve-actuators, and more particularly to electric valve-actuators having failsafe shutdown capability.

BACKGROUND OF THE INVENTION

Currently, steam and gas turbine manufacturers use a variety of hydraulic actuators to control the position of a turbine's many control and shutoff valves. These actuators are typically coupled directly to the valve and can completely shut off the flow of fuel/steam into the turbine in less than 250 milliseconds. As with nearly all hydraulic systems, the single biggest drawback of hydraulic actuation is its high susceptibility to failures due to hydraulic fluid contamination.

Furthermore, hydraulic actuation systems require hydraulic fluid (typically oil) to be in close proximity to the turbine casing. Since steam turbine casings can often be heated to temperatures in excess of 1000° F. during operation, any hydraulic fluid leaks pose an immediate fire danger to the turbine operators and equipment.

In response to these problems, the assignee of the instant application has started providing many different electric actuation solutions to turbine manufacturers. Historically, electric actuators have not been used due to slow slew speeds and reliability issues associated with electronics exposed to high temperatures. Technology advancements in electrical components and thermal design considerations have allowed for electronic products to be reliably exposed to high temperatures, but slow slew speeds remains a problem for electric actuation.

Electric actuators are composed of four main components: an electric motor; gearbox; lead screw; and return spring. Past solutions have attempted to achieve a high speed trip function by adding an electromagnetic clutch between the gearbox and lead screw (or at an intermediate stage in the gearbox). When the clutch is engaged, the lead screw is coupled to the gearbox and actuation is possible. When de-energized, the lead screw is de-coupled from the gearbox and allowed to freely spin as the actuator return spring moves the actuator to the fail-safe position. De-coupling the lead screw from the gearbox also reduces the amount of inertia attached to the screw and allows the device to accelerate quickly.

The problem with using an electromagnetic clutch comes in its size-to-torque capability and speed limitations. If a clutch is used between the lead screw and gearbox, it must have a very high torque capability. As torque capability increases, so too does the physical size of the clutch and the solenoid used to actuate it. As the solenoid grows, the time it takes to de-energize also increases to often unacceptably slow release times.

In view of this problem alternate designs position or move the clutch to an intermediate stage of the gearbox which will reduce the torque needed by the clutch. However, this increases the speed at which the clutch must spin. Regardless of where the clutch is positioned in the power train, the power (speed*torque) it must transmit remains the same. This will often result in speeds in excess of 10,000 RPM which greatly exceeds the speed limitations of most commercially available clutches. This also increases the inertia attached to the roller screw, slowing the acceleration of the screw during a trip to often unacceptably slow release times.

What is needed is an electric actuator that has high speed, fail-safe functionality that can be independently triggered in the event of an emergency shutdown. The invention provides such an electric actuator. These and other advantages of the invention, as well as additional inventive features, will be apparent from the description of the invention provided herein.

BRIEF SUMMARY OF THE INVENTION

In one aspect, the invention provides an electric actuator that provides a high speed, fail-safe function that can be independently triggered in the event of an emergency shutdown.

In one embodiment the design uses an electromagnetic brake attached to the roller nut, instead of a clutch attached to the screw as discussed above. Electromagnetic brakes are designed to have far higher torque capabilities and faster release times at the expense of most of the components (the caliper) remaining stationary. This results in the brake not needing to transmit any power during operation, and instead it provides only static torque.

The brake can also be re-engaged once the actuator reaches the tripped position. In one embodiment a soft-stop/over-travel system is provided to limit the impact loads on the lead screw. Preferably, the brake is used to limit the amount of bounce seen as the roller nut assembly rebounds off the soft stop spring.

In one embodiment a high speed shutdown device for an electric actuator includes an electric motor, a lead screw drivably coupled to the electric motor, and a lead screw nut threadably coupled to the lead screw. A drive body is operably coupled to the lead screw nut and is configured to linearly translate in conjunction with the lead screw nut but not to rotate in conjunction with the lead screw nut. The drive body is operably coupled to the lead screw nut via a thrust bearing. The device also includes a brake operatively coupled between the drive body and the lead screw nut. In one embodiment the brake includes a caliper mounted on the drive body and a rotor mounted on the lead screw nut. In such a configuration the brake enables and prevents rotation of the lead screw nut depending on whether it is disabled or enabled. To actuate the valve to which this embodiment is attached, an output shaft is drivably coupled to the drive body. To allow for failsafe operation, a return spring is in contact with the output shaft and is configured to apply a return force on the output shaft to position the output shaft in a retracted state. In embodiments where the failsafe position requires extension of the output shaft, the return spring is in contact with the drive body to position the output shaft in the extended state.

Preferably, the lead screw nut is prevented from rotating but is allowed to linearly translate along the lead screw during rotation of the lead screw by the electric motor when the brake applies a braking force. The lead screw nut is allowed to rotate when the brake does not apply a braking force. In such state, the lead screw nut is allowed to linearly translate along the lead screw under operation of the return force from the return spring when the lead screw is not being rotated by the electric motor in order to return the output shaft to the retracted position or the extended position depending on the particular embodiment. Once retracted, the lead screw nut is prevented from linearly translating along the lead screw when the lead screw is being rotated by the electric motor by operation of the return force from the return spring in order to maintain the output shaft in a failsafe position when the brake does not apply a braking force.

In one embodiment, the device further includes a soft stop spring positioned to engage the drive body in one embodiment or the output shaft in another embodiment to slow its linear translation over-travel beyond the return of the output shaft to the failsafe position. The soft stop spring engages the drive body via a soft stop spring land. The soft stop spring then linearly translates the drive body and/or output shaft after it has reached over-travel to at most eliminate the over-travel. The brake is energized in preferred embodiments to limit an amount of bounce seen as the drive body rebounds off the soft stop spring.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
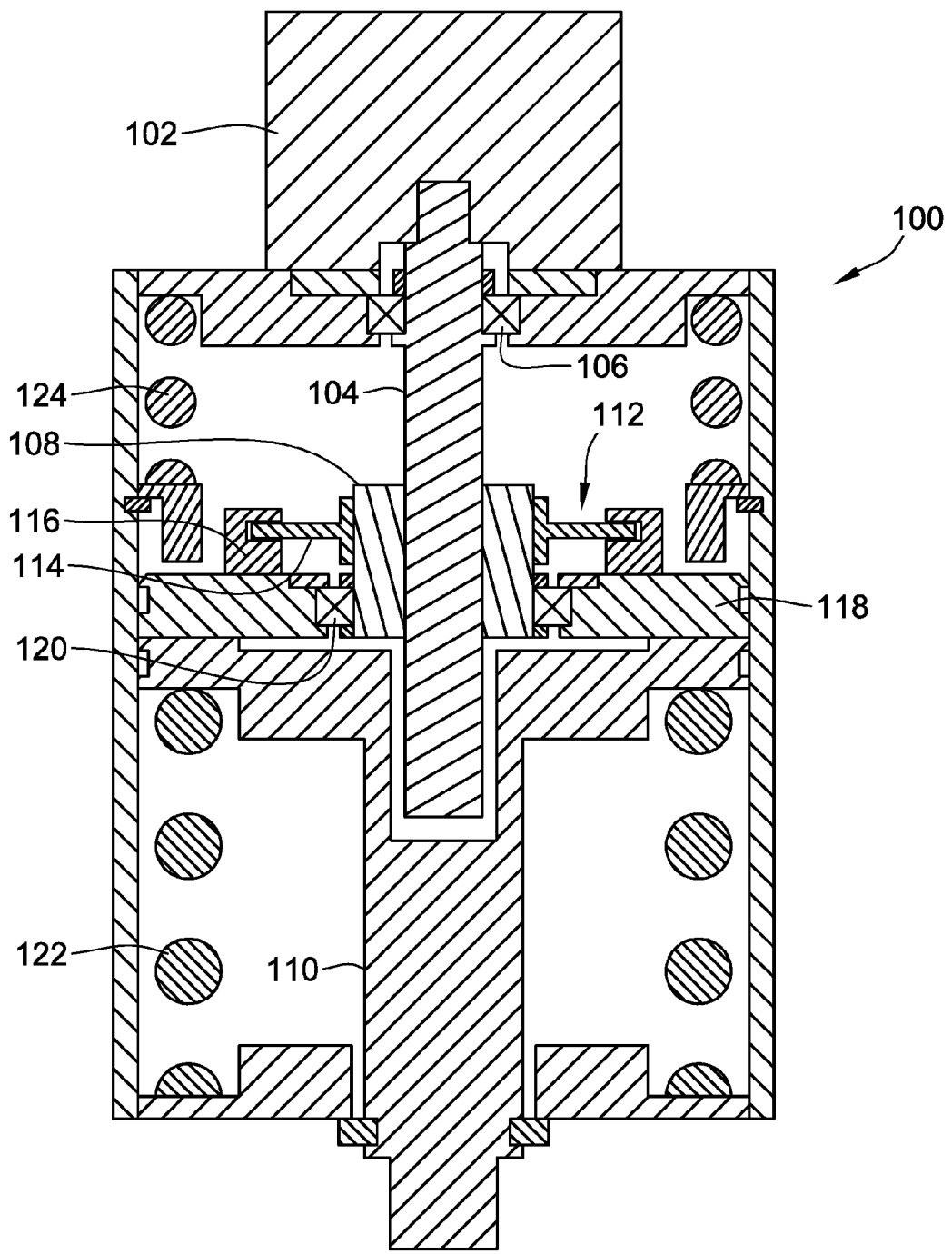
FIG. 1 is a cross-sectional illustration of an embodiment of a high speed shutdown device for an electric valve-actuator constructed in accordance with the teachings of the present invention shown in the retracted (shelf-state/tripped) state.

Turning now to the Drawings, and in particular to FIG. 1, there is illustrated a cross-section of an embodiment of a high speed shutdown device 100 for an electric valve-actuator that finds particular use in controlling the position of many of the control and shutoff valves for steam and gas turbine engines. It should be noted, however, that while the embodiment of the present invention illustrated in FIG. 1 finds particular applicability in such an operating environment, embodiments of the present invention are not strictly limited thereto. Instead, the following description should be taken by way of example and not by way of limitation. Indeed, the high speed shutdown device may find applicability in various operating environments that require rapid, fail-safe operation.

As shown in FIG. 1, the electric actuator includes an electric motor 102 that is used to rotationally drive a lead screw 104, either directly or through a gear train, that is held in position by thrust bearing 106. A lead screw nut 108 is threadably received on the lead screw 104 for linear translation upon rotation of the lead screw 104. Such linear translation may be in either direction depending on the direction of rotation of the lead screw 104 so as to extend or retract the output shaft 110 to control the operation of a valve to which this device 100 is attached.

In order to prevent the rotation of the lead screw nut 108 during energization of the motor 102 and rotation of the lead screw 104, an electric brake 112 is utilized. This electric brake 112 includes a brake rotor 114 that is attached to the lead screw nut 108, and a brake caliper 116 that is attached to a linearly translatable drive body 118. In other embodiments, other types of brakes are used as will become apparent to those skilled in the art from the description contained herein, e.g., drum brakes, band brakes, wrap spring brakes/clutches, etc. This drive body 118 includes a thrust bearing 120 that accommodates the lead screw nut 108.

When the electric brake 112 is actuated, the brake caliper 116 closes on the brake rotor 114 in order to prevent rotation of the lead screw nut 108. When held in this non-rotatable state, actuation of the motor 102 and rotation of the lead screw 104 results in linear translation of the lead screw nut 108, the drive body 118, and the output shaft 110. When the motor 102 rotates the lead screw 104 in the opposite direction, the lead screw nut 108 linearly translates in the opposite direction in order to move the drive body 118 in the opposite direction, which allows the output shaft 110 to be retracted under the force of the return spring 122. Such normal extension and retraction of the output shaft 110 under normal system operating conditions is, therefore, effectuated by energization of the electric brake 112 that prevents the rotation of the lead screw nut 108.

Such electromagnetic brakes 112 are designed to have far higher torque capabilities and faster release times than clutches as used in previous devices and discussed above. As a result, the brake 112 does not need to transmit any power during operation, and instead merely provides a static torque that prevents rotation of the lead screw nut 108. As just discussed, this enables linear translation under the rotation of the lead screw 104 by motor 102.

Figure 2:
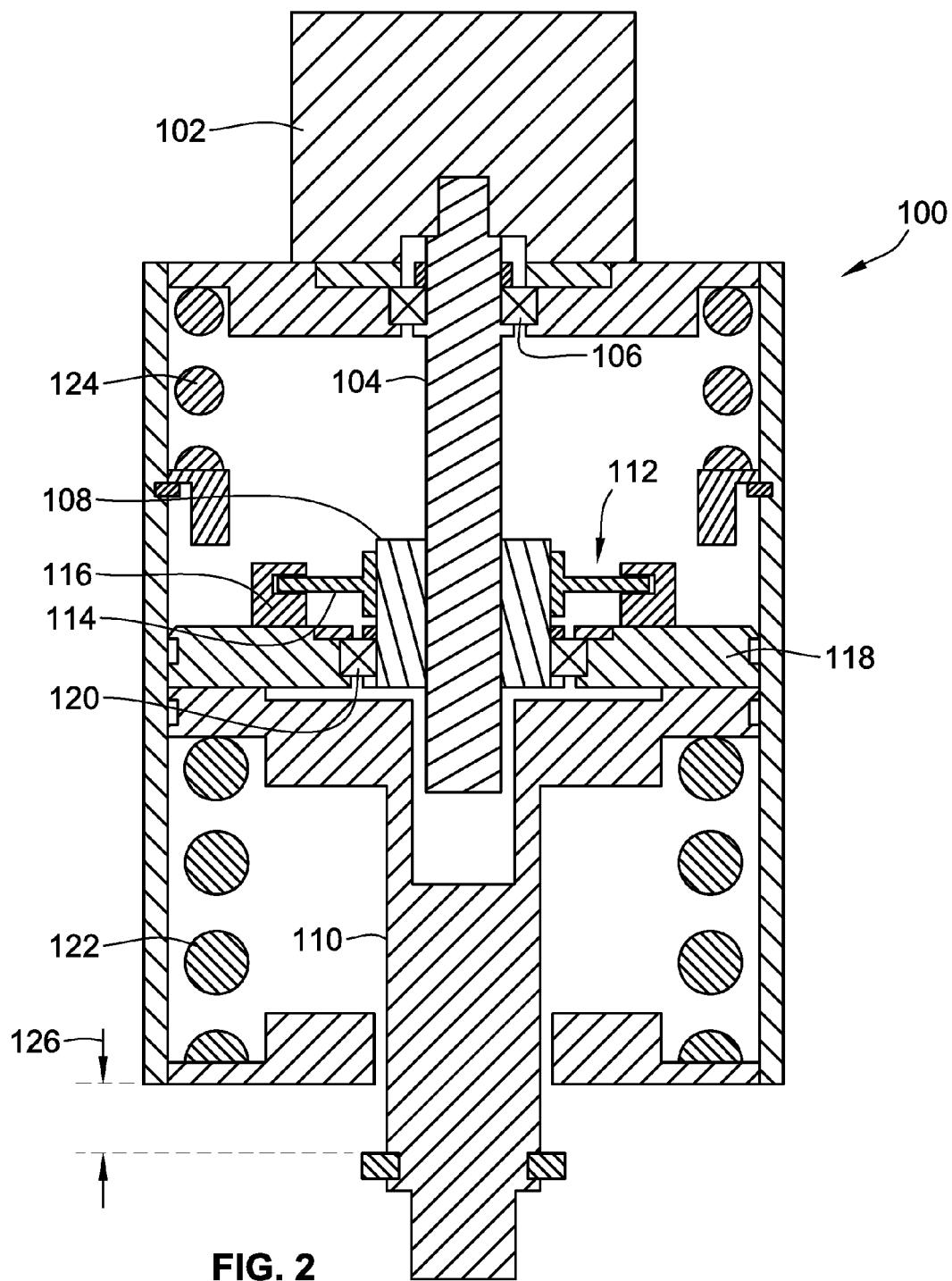
FIG. 2 is a cross-sectional illustration of the embodiment of the high speed shutdown device for an electric valve-actuator of FIG. 1 shown in the extended (actuated) state.

As indicated above, actuation of the brake 112 and energization of the motor 102 will result in the linear translation of the lead screw nut 108, drive body 118, and output shaft 110 under the rotation of lead screw 104. This condition is illustrated in FIG. 2 to which attention is now directed. As may be seen by comparison with FIG. 1, it is clear that such linear translation compresses the return spring 122. At the fullest extent of such actuation, the output shaft 110 is moved the distance illustrated as the stroke length 126. Depending on the type of valve to which this device is attached, such extension of the output shaft 110 may either open or close the valve. Typically, this extended position is used to position the valve in a controlled state, as opposed to a fail-safe state which would exist when the output shaft 110 is in a retracted position such as shown in FIG. 1. However, in other embodiments, the extended position may be the failsafe condition, in which case the return spring 122 and the soft stop spring 124 are reversed such that retraction of the output shaft 110 compresses the return spring 122. As discussed above, the movement between the extended and the retracted states may be provided by system control under normal operating conditions. This is accomplished in the illustrated embodiment by simply reversing the energization of the motor 102 to reverse the rotation of lead screw 104 to either extend or retract the output shaft 110 by linear translation of the lead screw nut 108 when the brake 112 is energized.

Recognizing, however, that system failures may occur, the high speed shutdown device 100 of the present invention provides a mechanism whereby the output shaft 110 is retracted to the fail-safe position shown in FIG. 1 under force of the return spring 122. This fail-safe operation is enabled by de-energizing the electric brake 112, or by a loss of power to the electric brake 112 during system failure, etc. Once the brake caliper 116 releases the brake rotor 114, the linear force exerted by the return spring 122 on the output shaft 110 and drive body 118 will result in rotation of the lead screw nut 108 and the brake rotor 114 as they are forced back along the lead screw 104. In other words, once the electric brake 112 is released, the lead screw nut 108 is free to rotate along the non-rotating lead screw 104 to move along its length in a direction towards the retracted position shown in FIG. 1. This release occurs very rapidly, and the low rotational inertia provided by the lead screw nut allows for a very rapid retraction of the output shaft 110.

Figure 3:
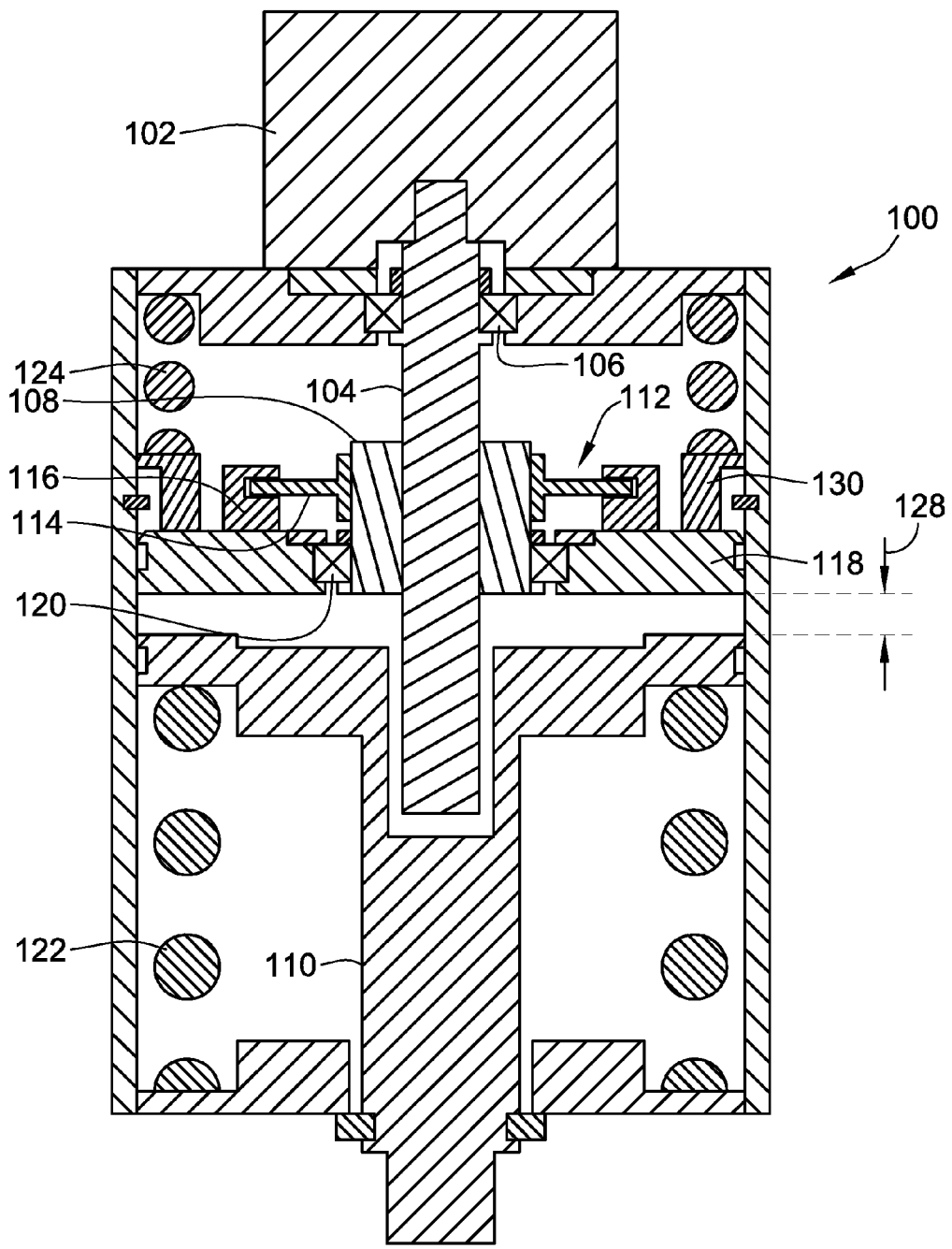
FIG. 3 is a cross-sectional illustration of the embodiment of the high speed shutdown device for an electric valve-actuator of FIG. 1 shown in the tripped (soft stop compressed) state.

In order to lessen the impact load on the lead screw 104 that could otherwise occur at the end of the high speed fail-safe retraction operation, a soft stop spring 124 is provided to allow some over-travel of the lead screw nut 108 and drive body 118 as shown in FIG. 3 to which attention is now directed.

As shown in this FIG. 3, the output shaft 110 has been fully retracted under the force of the decompression of return spring 122. While such a high speed retraction during the fail-safe condition may be abruptly stopped once the output shaft 110 is fully retracted against the body of the actuator, such hard impact on the threads of the lead screw 104 may result in damage thereto which could affect future operation of the actuator.

To prevent such impact on the lead screw 104, the device 100 of the present invention allows for over-travel 128 of the lead screw nut 108 and drive body 118. This over-travel is a result of the rotational inertia of the lead screw nut 108 resulting from the high speed retraction of the output shaft 110. In order to limit this over-travel 128 and provide for controlled kinetic energy dissipation, the soft stop spring 124 is provided. This soft stop spring 124 is compressed by the linear movement of the drive body 118 toward the retracted position during the period of over-travel 128 after the output shaft 110 has been fully retracted. The soft stop spring 124 engages the drive body 118 via a soft stop spring land 130. This compression force provided by the soft stop spring 124 slows the linear travel of the drive body 118, and therefore the rotation of the lead screw nut 108 on the stationary lead screw 104. This limits the impact energy imparted to the lead screw 104 that would otherwise result if a sudden stop of the linear and rotational motion of these elements occurred.

Once the soft stop spring 124 has been compressed, its spring force will drive the drive body 118 in the opposite direction to return it to the retracted shelf-state/tripped state shown in FIG. 1. The dynamic performance of such return may be tailored based upon the soft stop spring 124 utilized. Indeed, in conditions of system failure that do not affect the operational control of the actuators themselves, the electric brake 112 can be utilized to control this return from over-travel and limit or eliminate the bounce that may otherwise occur under the linear force exerted by the soft stop spring 124. In other words, if the entry into the fail-safe operation is not a result of the loss of electric power to the brake 112, then such operational control can be utilized once the fail-safe condition has resulted in the retraction of the output shaft 110 to minimize the return of the drive body 118 and lead screw nut 108 to their normal tripped position shown in FIG. 1 by actuation of the brake caliper 116 to again engage the brake rotor 14.

While the device 100 of the present invention enables the high speed shutdown for fail-safe operation, it may also be used as a redundant safety control to prevent actuation of the valve by preventing deployment of the output shaft 110 under erroneous motor control or energization of motor 102 resulting in rotation of lead screw 104. That is, the brake 112 can be de-energized such that the brake rotor 114 is free to rotate with the brake caliper 116. This rotational allowance also allows the lead screw nut 108 to rotate with the lead screw 104 as it rotates so that the lead screw nut 108 is not linearly driven along the lead screw 104. In other words, if the output shaft 110 is not to be deployed, the system control can provide redundancy to ensure that it is not deployed by de-energizing the brake 112.

If the motor 102 were to be energized erroneously, it would rotate the lead screw 104. Such rotation of the lead screw 104 would tend to drive the lead screw nut 108 linearly therealong. However, the force provided by the return spring 122, as well as the normal friction between the housing and the drive body 118 and output shaft 110 would oppose the driving of the lead screw nut 108 along the lead screw 104. This results ultimately in rotation of the lead screw nut 108 at the same speed as the lead screw 104. When the lead screw nut 108 is allowed to rotate at the same speed as the lead screw 104, it is not driven linearly, and therefore does not erroneously deploy the output shaft 110 to actuate the valve to which it is attached. Such redundant control ensures proper operation, and may be required in certain system configurations and uses.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A high speed shutdown device for an electric actuator, comprising:
    an electric motor;
    a lead screw drivably coupled to the electric motor;
    a lead screw nut threadably coupled to the lead screw;
    a drive body operably coupled to the lead screw nut and configured to linearly translate in conjunction with the lead screw nut but not to rotate in conjunction with the lead screw nut;
    a brake operatively coupled between the drive body and the lead screw nut such that the brake enables and prevents rotation of the lead screw nut;
    an output shaft drivably coupled to the drive body; and
    a return spring in contact with one of the output shaft or the drive body and configured to apply a return force on one of the output shaft or drive body to position the output shaft in a failsafe position;
    wherein the lead screw nut is allowed to rotate when the brake does not apply a braking force;
    wherein the lead screw nut is allowed to linearly translate along the lead screw under operation of the return force from the return spring when the lead screw is not being rotated by the electric motor in order to return the output shaft to the failsafe position; and
    further comprising a soft stop spring positioned to engage one of the drive body or output shaft to slow its linear translation over-travel beyond the return of the output shaft to the failsafe position.

2. The device of claim 1, wherein the soft stop spring linearly translates at least one of the drive body or the output shaft after it has reached over-travel to at most eliminate the over-travel.

3. The device of claim 2, wherein the brake is energized to limit an amount of bounce seen as the drive body rebounds off the soft stop spring.

4. The device of claim 1, wherein the soft stop spring is compressed during the linear translation over-travel.

5. A high speed shutdown device for an electric actuator, comprising:
    an electric motor;
    a lead screw drivably coupled to the electric motor;
    a lead screw nut threadably coupled to the lead screw;
    a drive body operably coupled to the lead screw nut and configured to linearly translate in conjunction with the lead screw nut but not to rotate in conjunction with the lead screw nut;
    a brake operatively coupled between the drive body and the lead screw nut such that the brake enables and prevents rotation of the lead screw nut;
    an output shaft drivably coupled to the drive body; and
    a return spring in contact with one of the output shaft or the drive body and configured to apply a return force on one of the output shaft or drive body to position the output shaft in a failsafe position;
    wherein the lead screw nut is allowed to rotate when the brake does not apply a braking force;
    wherein the lead screw nut is allowed to linearly translate along the lead screw under operation of the return force from the return spring when the lead screw is not being rotated by the electric motor in order to return the output shaft to the failsafe position; and
    wherein a soft stop spring engages the drive body via a soft stop spring land.

6. A high speed shutdown device for an electric actuator, comprising:
    an electric motor;
    a lead screw drivably coupled to the electric motor;
    a lead screw nut threadably coupled to the lead screw;
    a drive body operably coupled to the lead screw nut and configured to linearly translate in conjunction with the lead screw nut but not to rotate in conjunction with the lead screw nut;
    a brake operatively coupled between the drive body and the lead screw nut such that the brake enables and prevents rotation of the lead screw nut;
    an output shaft drivably coupled to the drive body; and
    a return spring in contact with one of the output shaft or the drive body and configured to apply a return force on one of the output shaft or drive body to position the output shaft in a failsafe position;
    wherein the drive body is operably coupled to the lead screw nut via a thrust bearing.

7. The device of claim 6, wherein the lead screw nut is prevented from rotating but is allowed to linearly translate along the lead screw during rotation of the lead screw by the electric motor when the brake applies a braking force.

8. The device of claim 6, wherein the lead screw nut is allowed to rotate when the brake does not apply a braking force.

9. The device of claim 8, wherein the lead screw nut is allowed to linearly translate along the lead screw under operation of the return force from the return spring when the lead screw is not being rotated by the electric motor in order to return the output shaft to the failsafe position.

10. The device of claim 8, wherein the lead screw nut is prevented from linearly translating along the lead screw when the lead screw is being rotated by the electric motor by operation of the return force from the return spring in order to maintain the output shaft in a failsafe position.

11. The device of claim 6, wherein the brake is one of a disc brake, a drum brake, a band brake, or a wrap spring brake/clutch.

12. The device of claim 6, wherein the return spring is in contact with the output shaft and configured to apply the return force on the output shaft to position the output shaft in a retracted state.

13. The device of claim 6, wherein the return spring is in contact with the drive body and configured to apply the return force on the output shaft to position the output shaft in an extended state.

14. The device of claim 6, wherein the brake applies a static torque to prevent rotation of the lead screw nut.

15. The device of claim 6, wherein actuation of the brake and energization of the motor results in linear translation of the lead screw nut, drive body, and output shaft under rotation of the lead screw and compresses the return spring.

16. The device of claim 6, wherein reversing the energization of the motor reverses the rotation of the lead screw.

17. A high speed shutdown device for an electric actuator, comprising:
    an electric motor;
    a lead screw drivably coupled to the electric motor;
    a lead screw nut threadably coupled to the lead screw;

a drive body operably coupled to the lead screw nut and configured to linearly translate in conjunction with the lead screw nut but not to rotate in conjunction with the lead screw nut;

a brake operatively coupled between the drive body and the lead screw nut such that the brake enables and prevents rotation of the lead screw nut;

an output shaft drivably coupled to the drive body; and a return spring in contact with one of the output shaft or the drive body and configured to apply a return force on one of the output shaft or drive body to position the output shaft in a failsafe position;

wherein the brake includes a caliper mounted on the drive body and a rotor mounted on the lead screw nut such that the brake enables and prevents rotation of the lead screw nut.

18. The device of claim 17, wherein when the electric brake is de-energized the brake caliper releases the brake rotor to allow rotation of the lead screw nut along the lead screw that is not rotating.

19. The device of claim 17, wherein the brake may be de-energized such that the brake rotor is free to rotate with the brake caliper so that the lead screw nut is not linearly driven along the lead screw and the output shaft is not deployed.

* * * * *